United States Patent
Watanabe et al.

(10) Patent No.: US 6,648,476 B2
(45) Date of Patent: Nov. 18, 2003

(54) PROJECTION TYPE IMAGE DISPLAY APPARATUS

(75) Inventors: Takashi Watanabe, Saitama (JP); Satoru Kawaai, Saitama (JP)

(73) Assignee: Fuji Photo Optical Co., Ltd., Saitama (JP)

(*) Notice: Subject to any disclaimer, the term of this patent is extended or adjusted under 35 U.S.C. 154(b) by 0 days.

(21) Appl. No.: 10/197,777

(22) Filed: Jul. 19, 2002

(65) Prior Publication Data

US 2003/0063264 A1 Apr. 3, 2003

(30) Foreign Application Priority Data

Sep. 28, 2001 (JP) ......................... 2001-299093

(51) Int. Cl.[7] .............................. G03B 21/14
(52) U.S. Cl. ........................... 353/97; 353/88
(58) Field of Search .................. 353/97, 88, 57, 353/60, 61

(56) References Cited

U.S. PATENT DOCUMENTS

| | | | |
|---|---|---|---|
| 5,473,410 A | * 12/1995 | Nishi | 355/53 |
| 5,622,418 A | * 4/1997 | Daijogo et al. | 353/97 |
| 5,982,563 A | * 11/1999 | Nakamura et al. | 359/727 |
| 6,193,376 B1 | * 2/2001 | Hayashi et al. | 353/30 |
| 6,220,730 B1 | * 4/2001 | Hewlett et al. | 362/297 |

FOREIGN PATENT DOCUMENTS

| | | |
|---|---|---|
| JP | 9-096867 | 8/1997 |
| JP | 10-048762 | 2/1998 |
| JP | 10-206816 | 8/1998 |

\* cited by examiner

Primary Examiner—Russell Adams
Assistant Examiner—Michael Dalakis
(74) Attorney, Agent, or Firm—Snider & Associates; Ronald R. Snider

(57) ABSTRACT

A projection type image display apparatus comprises a variable stop mechanism adapted to regulate the size of effective luminous flux diameter at a predetermined position in the optical path from an illumination optical system to a projection lens system, and image mode switching means for controlling operations of the variable stop mechanism. Respective image modes suitable for viewing in bright and dark surrounding environments are selected by switching between greater and smaller effective luminous flux diameters.

6 Claims, 2 Drawing Sheets

PROJECTION TYPE IMAGE DISPLAY APPARATUS

RELATED APPLICATIONS

This application claims the priority of Japanese Patent Application No. 2001-299093 filed on Sep. 28, 2001, which is incorporated herein by reference.

BACKGROUND OF THE INVENTION

1. Field of the Invention

The present invention relates to a projection type image display apparatus such as a video projector comprising image display means such as a liquid crystal display device and a digital micromirror device (hereinafter referred to as "MD"). More specifically, it relates to a projection type image display apparatus equipped with a switching function for image modes such as the brightness and contrast of projected images.

2. Description of the Prior Art

Various types of projection type image display apparatus have been known depending on differences in image display means for causing light from a light source to carry image information.

For example, a transmission type liquid crystal projector using, as its image display means, a transmission type liquid crystal display panel driven by an image signal has been known. This transmission type liquid crystal projector is configured such that the transmission type liquid crystal display panel is irradiated with light from a light source, so that a part of the light is transmitted therethrough, whereas thus transmitted light is caused to carry image information and converged by a projection lens, so as to project an image onto a screen (Japanese Unexamined Patent Publication No. HEI 10-206816 and the like).

On the other hand, a reflection type liquid crystal projector using a reflection type liquid crystal display panel such as a ferroelectric liquid crystal device (FLC device) as its image display means has been known. The reflection type liquid crystal display panel is configured such that, when a part of light emitted from a light source is reflected, thus reflected light is caused to carry image information (Japanese Unexamined Patent Publication No. HEI 10-48762 and the like).

Also known is a projector using, as its image display means, a DMD comprising a number of light reflection angle variable mirror devices each adapted to change the reflection angle of irradiation light according to the image signal so as to reflect only signal light toward a projection lens system. Using CMOS technology, high-reflectance minute rectangular mirrors (mirror devices) each adapted to change its inclination within the range of about 10 degrees according to image signals are formed on a silicon memory chip, whereby the DMD is made. A video projector using the DMD is configured such that the direction of reflection of light from the light source is controlled by changing angles of mirror devices, such that only desirable reflected light is converged onto a screen, so as to project an image thereon (Japanese Unexamined Patent Publication No. HEI 9-96867 and the like).

While the projection type image display apparatus can be categorized into various types depending on differences in the image display means used therein as mentioned above, it is a common problem to attain projection images which are easier to view.

For example, in order for projection images to be viewed easily in a bright surrounding environment such as one with interior illumination on, their brightness has been increasing. To this aim, improvements in the image display means have been proposed, and various attempts have been made concerning illumination and projection optical systems in order to utilize the light source light effectively. With recent advances in image display means, the advent of DMD in particular, it has become possible to increase the efficiency in utilization of light source light dramatically, thus allowing the projection images to increase their luminance greatly.

Increasing the brightness has made it easier to attain projection images suitable for viewing in a bright room, since the resulting images are easier to view even when their contrast is not so high. However, they will be harder to view in a dark room if their brightness is kept. Therefore, a projection type image display apparatus equipped with an image mode switching function having a changeover switch has come into practical use, which is adapted to switch between an image mode yielding bright projection images suitable for viewing in a bright room and an image mode yielding projection images with a suppressed brightness suitable for viewing in a dark room by operating this changeover switch.

In the above-mentioned image mode switching function, however, the quantity of light emitted from a light source section itself is directly regulated, so as to switch between the image modes, whereby the following problems may occur. Namely, though projection images which are easier to view can be obtained even if their contrast is not so high in the case where the images are bright, the projection images will be harder to view unless their contrast is high in the case where the images are dark. Hence, the contrast is required to increase in the case where the brightness of projection images is to be lowered. In the system in which the quantity of light emitted from the light source section is directly lowered, however, it has been difficult to increase the contrast.

SUMMARY OF THE INVENTION

In view of the foregoing circumstances, it is an object of the present invention to provide a projection type image display apparatus equipped with a function for switching image modes according to whether its surrounding environment is bright or dark, which can increase the contrast of projection images while lowering the brightness thereof in the case where the image mode suitable for viewing in a dark surrounding environment is selected.

For achieving the above-mentioned object, the present invention provides a projection type image display apparatus comprising a light source section, an illumination optical system for outputting light from the light source section as predetermined illumination light, image display means for converting the illumination light from the illumination optical system into image display light carrying image information and outputting thus obtained image display light, a projection lens system for emitting the image display light from the image display means and projecting an image onto an image projection surface, and image mode switching means for switching between a first image mode suitable for projection in a bright surrounding environment and a second image mode suitable for projection in a dark surrounding environment according to a setting for image mode switching; the projection image display apparatus further comprising a variable stop mechanism placed at a predetermined position of an optical path from the inside of the illumination optical system to the inside of the projection lens system and adapted to regulate the size of effective luminous flux diameter at the predetermined position; wherein the image mode switching means is configured so as to be able to control an operation of the variable stop mechanism; and wherein the image mode switching is carried out by operating the variable stop mechanism such that the effective luminous flux diameter becomes greater when the first image mode is selected and smaller when the second image mode is selected.

The predetermined position may be set within the illumination optical system.

The predetermined position may be set within or near the projection lens system.

The variable stop mechanism may be constituted by a first variable stop mechanism set within the illumination optical system, and a second variable stop mechanism set within or near the projection lens system.

Preferably, the variable stop mechanism comprises a cooling section for cooling the variable stop mechanism.

The projection type image display apparatus in accordance with the present invention may further comprise surrounding environment detecting means for detecting the brightness of the surrounding environment and setting the image mode switching according to a result of the detection.

As the image display means, a digital micromirror device can be used.

DESCRIPTION OF THE PREFERRED EMBODIMENTS

In the following, embodiments of the projection type image display apparatus in accordance with the present invention will be explained in detail with reference to the drawings.

Figure 1:
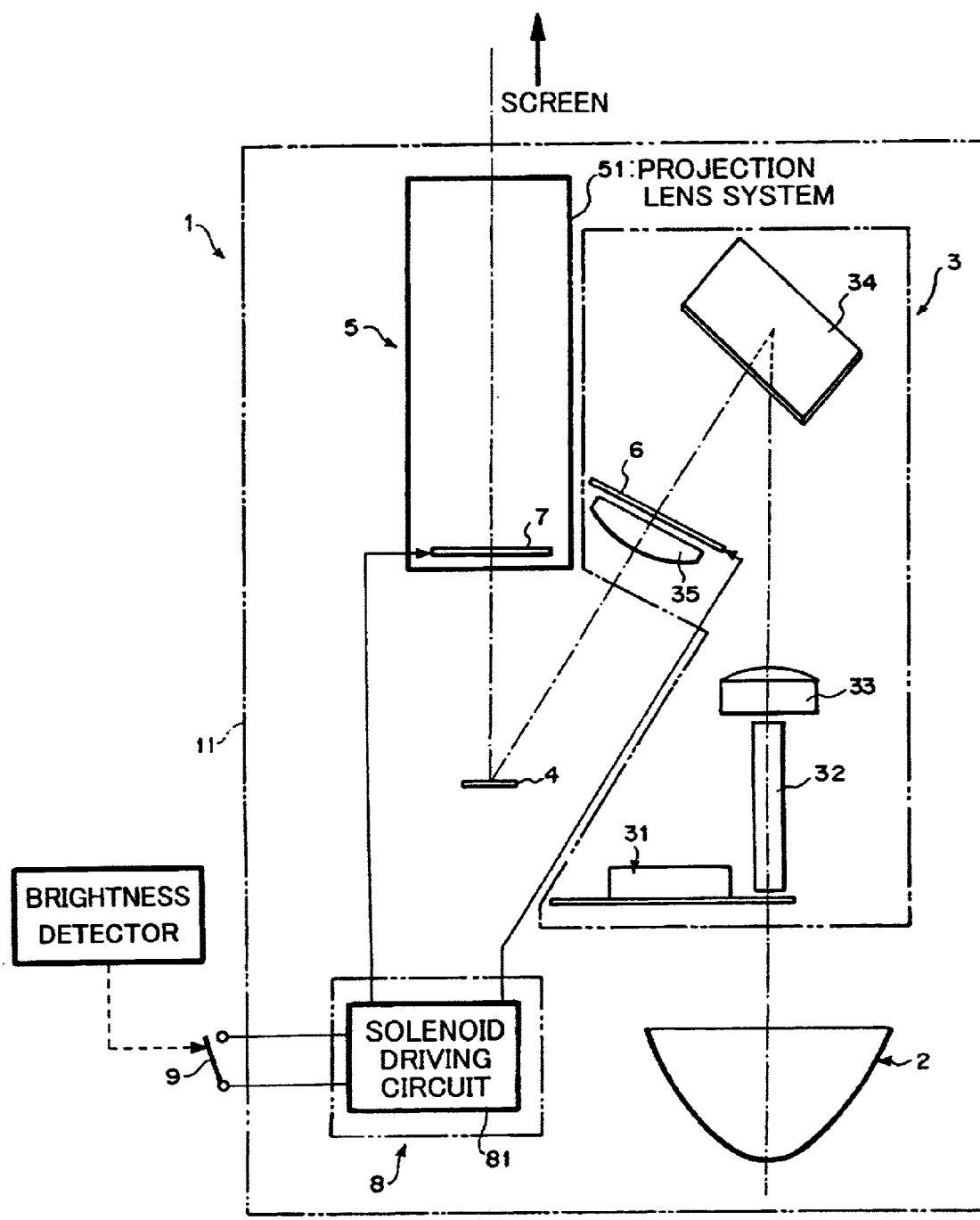
FIG. 1 is a diagram showing a schematic configuration of the projection type image display apparatus in accordance with an embodiment of the present invention.

FIG. 1 is a diagram showing a schematic configuration of the projection type image display apparatus in accordance with an embodiment of the present invention. As shown in FIG. 1, the projection type image display apparatus 1 in accordance with this embodiment is used as a video projector, for example, and comprises a light source section 2, an illumination optical system 3 disposed upstream the light source section 2 in the optical axis direction, an image display means 4 disposed upstream the illumination optical system 3 in the optical axis direction, and a projection lens system 5 disposed upstream the image display means 4 in the optical axis direction.

The illumination optical system 3 comprises a color wheel 31 for sequentially decomposing a luminous flux (white luminous flux) from the light source section 2 into three colors of R, G, and B with time, a rod integrator 32 for homogenizing the density of thus color-decomposed luminous fluxes, and a relay lens 33 for relaying the luminous fluxes having thus homogenized density. The illumination optical system 3 further comprises a reflecting mirror 34 for reflecting the luminous fluxes relayed by the relay lens 33, and a relay lens 35 for relaying thus reflected luminous fluxes and emitting thus relayed luminous fluxes toward the image display means 4, thus being configured so as to convert luminous fluxes incident from a light source into illumination light and emit the resulting illumination light toward the image display means 4.

For example, a DMD (digital micromirror device) is used as the image display means 4. The DMD has a mirror face formed by a very large number of (about 2.3 million) mirror devices (aluminum mirrors each having a rectangular form) arranged on a substrate, whereas the direction of reflection of each mirror device constituting the mirror face is independently switchable between two directions (forming an angle of about 20° therebetween). The switching of the direction of reflection is carried out by ON/OFF control of image signals (video signals) fed into the DMD using each mirror device as a pixel. Under this control, the image display means 4 converts the illumination light incident from the illumination optical system 3 into image display light carrying image information, and emits the resulting image display light toward the projection lens system 5.

The projection lens system 5 comprises, though not depicted, a plurality of lenses arranged in series on the optical axis within a lens barrel 51, and a lens moving mechanism adapted to move the plurality of lenses along the optical axis so as to change the focal length, thereby altering the image magnification and the like, whereas the image display light incident thereon from the image display means 4 is projected onto the image projection surface (screen).

Also, the projection type image display apparatus 1 comprises a first variable stop mechanism 6 disposed at a position downstream the relay lens 35 within the illumination optical system 3, a second variable stop mechanism 7 disposed at the rear end side within the lens barrel 51 of the projection lens system 5, and image mode switching means 8 for switching image modes for projection images by controlling the two variable stop mechanisms 6, 7.

Figure 2A:
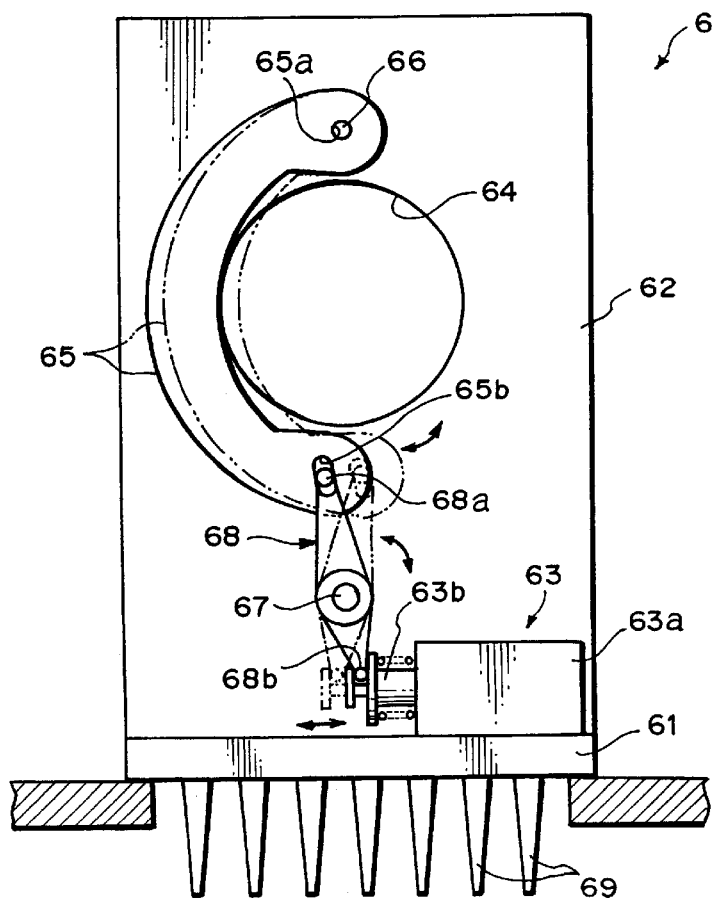
FIGS. 2A and 2B are front and side views showing a detailed configuration of the first variable stop mechanism shown in FIG. 1, respectively.
Figure 2B:
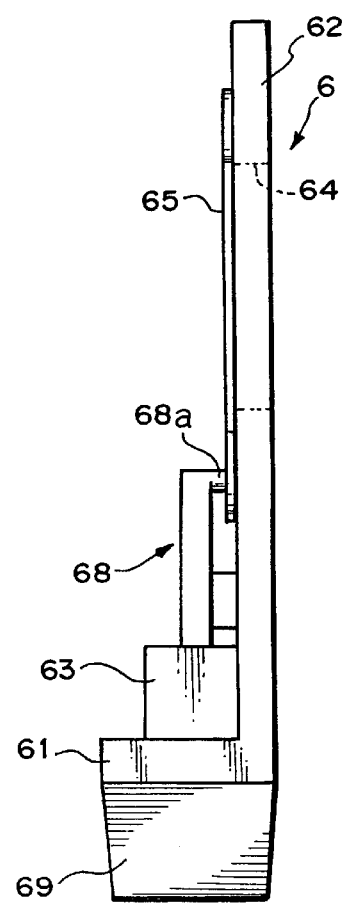

FIGS. 2A and 2B show the configuration of the first variable stop mechanism 6 in further detail. FIGS. 2A and 2B are front and side views, respectively. As shown in FIGS. 2A and 2B, the first variable stop mechanism 6 comprises a base 61 secured to the body side of the apparatus, a wall 62 integrally formed with the base 61 so as to rise from one end of the base 61, and a holding type solenoid 63 attached to the wall 62 and base 61.

The center part of the wall 62 is formed with a circular opening 64 through which illumination light passes. A stop blade 65 having a substantially arc form is axially supported in a rotatable fashion near the opening 64 with a pin hole 65a formed at one end part receiving a pin 66 rising from the wall 62. Disposed near the other end part of the stop blade 65 is a rocking lever 68 axially supported in a rotatable fashion by a pin 67 rising from the wall 62. The other end part of the stop blade 65 is formed with an elongated hole 65b, whereas an engagement pin 68a formed at one end part of the rocking lever 68 engages the elongated hole 65b so as to be slidable therewithin.

The holding type solenoid 63 comprises a body 63a secured to the base 61 and wall 62, and a rod 63b configured so as to be movable with respect to the body 63a according to control signals, whereas the leading end part of the rod 63b slidably holds a holding pin 68b formed at the other end part of the rocking lever 68.

The first variable stop mechanism 6 is placed at a position effective for functioning as an aperture stop of the luminous flux diameter in the illumination optical system 3, e.g., an entrance or exit pupil position or the vicinity thereof within the illumination optical system 3. The opening 64 is formed with a diameter having substantially the same size as that of the effective luminous flux diameter of illumination light at the position of placement with the center of the opening 64 aligning with the optical axis. The lower face of the base 61 is provided with a cooling fin 69, so as to release the amount of heat of the variable stop mechanism 6 itself, which increases upon heating with the illumination light.

In thus configured first variable stop mechanism 6, the holding type solenoid 63 is driven by a control signal from the image mode switching means 8, and the rocking lever 68 and stop blade 65 are driven in synchronization with the holding type solenoid 63, whereby the stop blade 65 moves between a position where it covers a part of the rim of the opening 64 and a position fully opening the opening 64. When the stop blade 65 covers a part of the rim of the opening 64, the periphery of the effective luminous flux of illumination light is partly eclipsed, whereby the effective luminous flux diameter is reduced. Though the quantity of illumination light decreases when the effective luminous flux diameter is lowered, the luminous flux entering the projection lens system 5 is narrowed, so that the scattering light occurring at the inner face of the lens barrel 51 of the projection lens system 5 and the like are reduced, whereby detrimental light decreases. If the detrimental light is reduced, the projection images will attain a higher contrast. When the effective luminous flux diameter is reduced within the illumination system 3 by the first variable stop mechanism 6, the quantity of light incident on the second variable stop mechanism 7 within the projection lens system 5 decreases, whereby temperature can be restrained from rising within the projection lens system 5.

Though not depicted, the second variable stop mechanism 7 has a configuration substantially the same as that of the first variable stop mechanism 6, and is placed at a position effective for functioning as an aperture stop for the luminous flux diameter in the projection lens system 5, e.g., an entrance or exit pupil position or the vicinity thereof within the projection lens system 5. The second variable stop mechanism 7 may also be disposed outside the projection lens system 5 in the vicinity thereof, instead of the inside thereof.

As with the first variable stop mechanism 6, the second variable stop mechanism 7 is driven by a control signal from the image mode switching means 8, so as to change the effective luminous flux diameter of image display light. The quantity of image display light is lowered when the effective luminous flux diameter is reduced. While the image display light within the effective luminous flux diameter includes detrimental light such as diffracted light generated in the image display means 4 and the like, this detrimental light decreases when the effective luminous flux diameter is made smaller. The contrast of projection images will increase if the detrimental light is reduced. Also, when the effective luminous flux diameter is made smaller, the luminous flux within the projection lens system 5 is narrowed, so that the scattering light occurring at the inner face of the lens barrel of the projection lens system 5 and the like are reduced, whereby detrimental light decreases.

As shown in FIG. 1, the image mode switching means 8 for controlling the above-mentioned operations of the first and second variable stop mechanisms 6, 7 comprises a solenoid driving circuit 81, which is connected to an image mode changeover switch 9 placed outside an apparatus housing 11.

The image mode changeover switch 9 is configured such that a user manually carries out switching between a first image mode (high-luminance mode) suitable for viewing in a bright room and a second image mode (cinema mode) suitable for viewing in a dark room, for example, in a selective manner as appropriate. When the image mode changeover switch 9 is turned OFF so as to select the first image mode, the first and second variable stop mechanisms 6, 7 are driven by a control signal from the solenoid driving circuit 81, so that the effective luminous flux diameter of illumination light is made greater by the first variable stop mechanism 6, and the effective luminous flux diameter of image display light is similarly made greater by the second variable stop mechanism 7. When the image mode changeover switch 9 is turned ON so as to select the second image mode, by contrast, the first and second variable stop mechanisms 6, 7 are driven by a control signal from the solenoid driving circuit 81, so that each of the respective effective luminous flux diameters of illumination light and image display light is made smaller.

Instead of manually switching image modes, a photosensor for detecting the brightness of the surrounding environment may be provided so that the image mode changeover switch 9 is automatically changed over according to the result of detection effected by the photosensor. In this case, for example, a predetermined threshold acting as a reference for switching concerning the brightness of a room is set, and the image mode changeover switch 9 is configured so as to be automatically switchable such that the first image mode is selected when the brightness of a room exceeds the threshold whereas the second image mode is selected when the brightness is not greater than the threshold.

Operations of thus configured projection type image display apparatus 1 will now be explained.

First, when the user turns OFF the image mode changeover switch 9 so as to select the first image mode suitable for viewing in a bright room, the first and second variable stop mechanisms 6, 7 are driven by control signals from the solenoid driving circuit 81, so that the first variable stop mechanism 6 attains a state for increasing the effective luminous flux diameter of illumination light, and the second variable stop mechanism 7 similarly attains a state for increasing the effective luminous flux diameter of image display light.

The white light incident on the illumination optical system 3 from the light source section 2 is sequentially color-separated by the color wheel 31 with time, and then the density of thus separated color light components is homogenized by the rod integrator 32. Thus homogenized light travels the relay lens 33 and the reflecting mirror 34 and then passes through the first variable stop mechanism 6. The first variable stop mechanism 6 is in a state where its opening 64 is not covered, whereby the illumination light passes through the first variable stop mechanism 6 while in a state with a greater effective luminous flux diameter, i.e., a state with a greater quantity of light, and is emitted from the illumination optical system 3 to the image display means 4 by way of the relay lens 35.

The illumination light emitted from the illumination optical system 3 so as to be made incident on the image display means 4 is converted therein into image display light carrying image information, and the resulting image display light is emitted toward the projection lens system 5. The image display light emitted from the image display means 4 so as to be made incident on the projection lens system 5 passes through the second variable stop mechanism 7. The second variable stop mechanism 7 is in a state where its opening is not covered, whereby the image display light passes through the second variable stop mechanism 7 while in a state where the effective luminous flux diameter is greater, i.e., the quantity of light is greater, and travels through the lens group within the lens barrel 51, so as to be projected from the projection lens system 5 onto an image projection surface (screen) as a high-luminance projection image (e.g., with a light quantity of 1000 lumens and a contrast of 500:1) suitable for viewing in a bright room.

On the other hand, when the user turns ON the image mode change over switch 9 so as to select the second image mode suitable for viewing in a dark room, the first and second variable stop mechanisms 6, 7 are driven by control signals from the solenoid driving circuit 8, so that the first variable control mechanism 6 attains a state for decreasing the effective luminous flux diameter of illumination light, whereas the second variable control mechanism 7 attains a state for decreasing the effective luminous flux diameter of image display light.

The white light made incident on the illumination optical system 3 from the light source section 2 is sequentially color-separated by the color wheel 31 with time, and then the density of thus separated color light components is homogenized by the rod integrator 32. Thus homogenized light travels the relay lens 33 and the reflecting mirror 34 and then passes through the first variable stop mechanism 6. The first variable stop mechanism 6 is in a state where a part of its opening 64 is covered, whereby the illumination light passes through the first variable stop mechanism 6 while in a state with a smaller effective luminous flux diameter, i.e., a state where the luminous flux entering the projection lens system 5 is narrowed so that scattering light occurring at the inner face of the lens barrel 51 of the projection lens system 5 and the like can be reduced although the quantity of light decreases, and is emitted from the illumination optical system 3 to the image display means 4 by way of the relay lens 35.

The illumination light emitted from the illumination optical system 3 so as to be made incident on the image display means 4 is converted therein into image display light carrying image information, and the resulting image display light is emitted toward the projection lens system 5. The image display light emitted from the image display means 4 so as to be made incident on the projection lens system 5 passes through the second variable stop mechanism 7. The second variable stop mechanism 7 is in a state where a part of its opening is covered, whereby the image display light passes through the second variable stop mechanism 7 while in a state where the effective luminous flux diameter is smaller, i.e., a state where the detrimental light such as diffracted light generated in the image display means 4 and the like is reduced although the quantity of light decreases, and travels through the lens group within the lens barrel 51, so as to be projected from the projection lens system 5 onto an image projection surface (screen) as a low-luminance, high-contrast projection image (e.g., with a light quantity of 600 lumens and a contrast of 1000:1) suitable for viewing in a dark room.

Though the projection type image display apparatus in accordance with an embodiment of the present invention is explained in the foregoing, the projection type image display apparatus in accordance with the present invention is not limited to that of the above-mentioned embodiment but can be modified in various manners.

For example, though the apparatus in accordance with above-mentioned embodiment classifies the brightness/darkness of surrounding environment into two stages of bright and dark cases, and sets two image mode switching stages corresponding thereto, a greater number of stages may be set for classifying the brightness/darkness of the surrounding environment, so as to set a greater number of image modes corresponding to the brightness/darkness of the surrounding environment.

Also, the variable stop mechanism may be provided with one of the illumination optical system and projection lens system alone.

Though the variable stop mechanism comprises a single stop blade in the apparatus of the above-mentioned embodiment, two or more stop blades may be provided depending on relationships to optical systems.

As the image display means used in the projection type image display apparatus of the present invention, not only the above-mentioned DMD, but also a reflection type liquid crystal display panel such as FLC device, and a transmission type liquid crystal display panel can be used.

As explained in detail in the foregoing, the projection type image display apparatus in accordance with the present invention comprises a variable stop mechanism adapted to regulate the size of effective luminous flux diameter at a predetermined position in the optical path from the inside of the illumination optical system to the inside of the projection lens system, and image mode switching means for controlling operations of the variable stop mechanism, and changes image modes by switching between greater and smaller effective luminous flux diameters.

Therefore, when switching to an image mode suitable for viewing in a dark surrounding environment, the variable stop mechanism can decrease the effective luminous flux diameter, so as to lower the light quantity of luminous flux passing therethrough, thereby reducing the scattering light within the projection optical system and the like while lowering the brightness of projection images, or eliminate the detrimental light included in the rim of the effective luminous flux diameter, thereby increasing the contrast of projection images.

What is claimed is:

1. A projection type image display apparatus comprising a light source section, an illumination optical system for outputting light from said light source section as predetermined illumination light, image display means for converting said illumination light from said illumination optical system into image display light carrying image information and outputting thus obtained image display light, a projection lens system for emitting said image display light from said image display means and projecting an image onto an image projection surface, and image mode switching means for switching between a first image mode suitable for projection in a bright surrounding environment and a second image mode suitable for projection in a dark surrounding environment according to a setting for image mode switching;

wherein said illumination optical system comprises an integrator means so as to homogenize the density of illumination light from said light source;

said projection image display apparatus further comprising a variable stop mechanism placed at a conjugate position with said image display means position of an optical path from said integrator means of said illumination optical system to said image display means and adapted to regulate the size of effective luminous flux diameter at said predetermined position;

wherein said variable stop mechanism is placed at a position of a pupil position or the vicinity thereof:

wherein said image mode switching means is configured so as to be able to control an operation of said variable stop mechanism; and wherein said image mode switching is carried out by operating said variable stop mechanism such that said effective luminous flux diameter becomes greater when said first image mode is selected and smaller when said second image mode is selected.

2. A projection type image display apparatus according to claim 1, wherein an another variable stop mechanism is set within or near said projection lens system.

3. A projection type image display apparatus according to claim 1, wherein said variable stop mechanism comprises a cooling section for cooling the variable stop mechanism.

4. A projection type image display apparatus according to claim 1, further comprising surrounding environment detecting means for detecting the brightness of said surrounding environment and setting said image mode switching according to a result of said detection.

5. A projection type image display apparatus according to claim 1, wherein said image display means is a digital micromirror device.

6. A projection type image display apparatus according to claim 1, wherein said integrator means is a rod integrator.

* * * * *

UNITED STATES PATENT AND TRADEMARK OFFICE
CERTIFICATE OF CORRECTION

PATENT NO. : 6,648,476 B2
DATED : November 18, 2003
INVENTOR(S) : Takashi Watanabe and Satoru Kawaai It is certified that error appears in the above-identified patent and that said Letters Patent is hereby corrected as shown below:

<u>Column 9,</u>
Line 2, delete "thereof:" and substitute therefore -- thereof; --

Signed and Sealed this

Twenty-fourth Day of February, 2004

JON W. DUDAS
*Acting Director of the United States Patent and Trademark Office*